US 6,578,894 B2

(12) United States Patent
Motozawa

(10) Patent No.: US 6,578,894 B2
(45) Date of Patent: Jun. 17, 2003

(54) AUTOMOTIVE VEHICLE OCCUPANT PROTECTION SYSTEM

(75) Inventor: Yasuki Motozawa, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/211,348

(22) Filed: Aug. 5, 2002

(65) Prior Publication Data

US 2003/0062737 A1 Apr. 3, 2003

(30) Foreign Application Priority Data

Sep. 18, 2001 (JP) .................................... 2001-282708

(51) Int. Cl.$^7$ ............................................. B62D 23/00
(52) U.S. Cl. ...................... 296/35.2; 296/68.1; 280/806
(58) Field of Search ...................... 296/35.2; 280/801.1, 280/808, 806, 807, 784, 804; 180/282; 297/480; 601/155

(56) References Cited

U.S. PATENT DOCUMENTS

| 3,508,783 | A | * | 4/1970 | Schlanger | 296/35.2 |
|---|---|---|---|---|---|
| 3,589,466 | A | * | 6/1971 | Dudley | 296/35.2 |
| 3,695,629 | A | * | 10/1972 | Schlanger | 296/35.2 |
| 3,743,347 | A | * | 7/1973 | Shaw | 296/35.2 |
| 3,806,184 | A | * | 4/1974 | Dean | 296/35.2 |
| 3,831,998 | A | * | 8/1974 | Hewitt | 296/35.2 |
| 3,837,422 | A | * | 9/1974 | Schlanger | 296/35.2 |
| 3,929,203 | A | * | 12/1975 | Nagazumi | 280/806 |
| 4,310,179 | A | * | 1/1982 | Winnale et al. | 280/803 |
| 4,400,013 | A | * | 8/1983 | Imai | 280/801.1 |
| 4,763,924 | A | * | 8/1988 | Karlin et al. | 280/806 |
| 5,251,911 | A | * | 10/1993 | Blake | 296/35.1 |
| 5,738,378 | A | * | 4/1998 | Yazejian | 296/35.2 |
| 6,168,574 | B1 | * | 1/2001 | VanDemark | 601/155 |
| 6,193,296 | B1 | * | 2/2001 | Motozawa et al. | 296/68.1 |
| 6,254,164 | B1 | * | 7/2001 | Kawamura et al. | 296/68.1 |
| 6,394,535 | B1 | * | 5/2002 | Kawamura et al. | 296/189 |
| 6,422,632 | B1 | * | 7/2002 | Kamei et al. | 296/68.1 |
| 6,464,275 | B2 | * | 10/2002 | Laurent et al. | 296/35.2 |
| 2002/0079689 | A1 | * | 6/2002 | Motozawa et al. | 280/806 |
| 2003/0010560 | A1 | * | 1/2003 | Motozawa | 280/806 |
| 2003/0025342 | A1 | * | 2/2003 | Belloso | 293/132 |
| 2003/0029661 | A1 | * | 2/2003 | Motozawa | 296/68.1 |
| 2003/0030264 | A1 | * | 2/2003 | Motozawa | 280/806 |

FOREIGN PATENT DOCUMENTS

JP           7-101354           4/1995

* cited by examiner

*Primary Examiner*—Kiran Patel
(74) *Attorney, Agent, or Firm*—Arent Fox Kintner Plotkin & Kahn, PLLC

(57) ABSTRACT

In an automotive vehicle occupant protection system, the vehicle body comprises a chassis and a vehicle body main part mounted on said chassis in a relatively moveable manner in a fore-and-aft direction, and an arrangement for engaging a vehicle body main part to the chassis under normal condition, and releasing the vehicle body main part from the chassis upon occurrence of a vehicle crash, and a bumper member provided on the chassis and adapted to collide with a stopper member provided on the vehicle body main part after a prescribed rearward travel of the chassis relative to the vehicle body main part. Thus, upon occurrence of a crash, the chassis having a substantial mass starts decelerating, and moves rearward with respect to the remaining part of the vehicle body. This in turn causes the tension of the seat belt to increase, and the restraint on the vehicle occupant to increase. This is followed by the application of a reverse deceleration to the chassis so that the initial sharp rise in the deceleration acting on the vehicle occupant is smoothly connected to the ride down state in which the vehicle occupant decelerates at the same rate as the vehicle body.

7 Claims, 7 Drawing Sheets

AUTOMOTIVE VEHICLE OCCUPANT PROTECTION SYSTEM

CROSS REFERENCE TO RELATED PATENTS (PATENT APPLICATIONS)

Reference should be made to the following commonly assigned prior patents and the contents of these patents (patent applications) are hereby incorporated in this application by reference.

| Our Ref: | Patent (Application) Number | Issue (Application) Date |
|---|---|---|
| F650 | 6,193,296 | Feb. 27, 2001 |
| F651 | 6,1865,74 | Feb. 13, 2001 |
| F655 | 6,2030,98 | Mar. 20, 2001 |
| F685 | 6,2541,64 | Jul. 03, 2001 |
| F686 | 09/608,669 | Jun. 30, 2000 |
| F687 | 09/648,190 | Aug. 23, 2000 |
| F716 | 09/729,973 | Dec. 06, 2000 |
| F781 | 10/005,739 | Nov. 06, 2001 |
| F817 | unknown | |
| F818 | unknown | |
| F819 | unknown | |

TECHNICAL FIELD

The present invention relates to a vehicle occupant protection system for improving the crash safety of the vehicle.

BACKGROUND OF THE INVENTION

In recent years, motor vehicles have been often fitted with a pretensioner device which positively increases the tension of the seat belt for restraining the vehicle occupant at the time of a crash and improves the protection of the vehicle occupant. The deceleration acting on the vehicle occupant who is restrained to the seat by a restraint device such as a seat belt starts rising only when the forward inertia force acting on the vehicle occupant at the time of the crash has started to be supported by the seat belt. As it is not possible to eliminate a certain amount of resiliency and slack in the seat belt, the deceleration of the vehicle occupant reaches a peak level only when the vehicle occupant has moved forward a certain distance under the inertia force and the elongation of the seat belt has reached its maximum extent. The peak value of the deceleration of the vehicle occupant gets greater as the forward displacement of the vehicle occupant under the inertia force increases, and is known to be substantially larger than the average deceleration of the passenger compartment of the vehicle body.

When the relationship between the vehicle body deceleration and the vehicle occupant deceleration is compared to the relationship between the input and output of a system consisting of a spring (vehicle occupant restraint device) and a mass (mass of the vehicle occupant), it can be readily understood that the maximum elongation and time history of the spring are dictated by the waveform (time history) of the vehicle body deceleration. Therefore, it can be concluded that the waveform of the vehicle body deceleration should be controlled in such a manner that not only the average deceleration acting on the vehicle body is reduced but also the overshoot of the vehicle occupant deceleration due to the elongation of the spring (vehicle occupant restraint device) is minimized.

In the conventional vehicle body structure, the impact energy is absorbed by a crushable zone, consisting of an impact reaction generating member such as side beams and gaps defined between various components, provided in a front part of the vehicle body, and the waveform of the vehicle body deceleration is adjusted by changing the resulting reaction properties by means of the selection of the dimensions and deformation properties of such parts. The deformation mode of the vehicle body other than the passenger compartment at the time of a crash may also be appropriately selected so that the deceleration of the passenger compartment of the vehicle body may be reduced, and the deformation may be prevented from reaching the passenger compartment. Such vehicle body structures are proposed in Japanese patent laid open publication (kokai) No. 07-101354.

It is important to note that the injury to the vehicle occupant at the time of a vehicle crash can be minimized by reducing the maximum value of the acceleration (deceleration) acting on the vehicle occupant which is dictated by the waveform (time history) of the vehicle body deceleration. It is also important to note that the total amount of deceleration (time integration of deceleration) which the vehicle occupant experiences during a vehicle crash is fixed for the given intensity of crash (or vehicle speed immediately before the crash). Therefore, as shown in FIG. 6 for instance, the ideal waveform (time history) of the vehicle body (seat) deceleration (G2) for the minimization of the vehicle occupant deceleration (G1) should consist of an initial interval (a) for producing a large deceleration upon detection of a crash, an intermediate interval (b) for producing an opposite deceleration, and a final interval (c) for producing an average deceleration.

The initial interval allows the vehicle occupant to experience the deceleration from an early stage so that the deceleration may be spread over an extended period of time, and the peak value of the deceleration to be reduced. According to a normal vehicle body structure, owing to the presence of a crushable zone in a front part of the vehicle and a slack and elongation of the restraint system such as a seat belt, it takes a certain amount of time for the impact of a crash to reach the vehicle occupant. The delay in the transmission of deceleration to the vehicle occupant must be made up for by a subsequent sharp rise in deceleration according to the conventional arrangement. The final interval corresponds to a state called a ride-down state in which the vehicle occupant moves with the vehicle body as a single body. The intermediate interval is a transitional interval for smoothly connecting the initial interval and final interval without involving any substantial peak or dip in the deceleration. Computer simulations have verified that such a waveform for the vehicle body deceleration results in a smaller vehicle occupant deceleration than the case of a constant deceleration (rectangular waveform) for a given amount of deformation of the vehicle body (dynamic stroke).

According to the conventional vehicle body structure, the vehicle body components of the crushable zone start deforming from a part having a relatively small mechanical strength immediately after the crash, and a part thereof having a relatively high mechanical strength starts deforming thereafter. As a result, the waveform of the crash reaction or the vehicle body deceleration is small in an early phase, and then gets greater in a later phase so that the vehicle occupant deceleration cannot be adequately reduced. To eliminate such a problem, it has been proposed to obtain a prescribed amount of reaction force by making use of the collapsing of the side beams and to maintain a stable reaction by providing a plurality of partition walls in the side beams (Japanese patent laid-open publication (kokai) No.

07-101354). However, such previous proposals can only maintain the vehicle body deceleration at an approximately constant level at most, and are unable to provide a more effective deceleration waveform.

To minimize the adverse effect of the resiliency of the seat belt, it is known to provide a pretensioner device in association with the seat belt to positively tension the seat belt at the time of a vehicle crash. According to another previously proposed structure, at least one of the anchor points of the seat belt is attached to a member which undergoes a movement relative to the remaining part of the vehicle which tends to increase the tension of the seat belt in an early phase of a vehicle crash. Such devices are beneficial in reducing the maximum level of deceleration acting on the vehicle occupant at the time of a vehicle crash, but a device capable of more precise control of the vehicle occupant deceleration is desired.

Referring to FIG. 9, the vehicle occupant deceleration G1 and vehicle body deceleration G2 correspond to the input and output of a transfer function representing a two-mass spring-mass system consisting of the mass Mm of a vehicle occupant, a spring (such as a seat belt), and a vehicle body mass Mv. More specifically, the vehicle body deceleration G2 can be given as a second-order differentiation of the coordinate of the vehicle body mass Mv with respect to time.

However, in an actual automotive crash, if a three-point seat belt is used, the shoulder belt portion of the seat belt which can be considered as a spring engages the chest of the vehicle occupant corresponding to the center of the vehicle occupant mass Mm so that the shoulder belt portion can be considered as consisting of two springs, one extending between the chest and shoulder anchor, the other extending between the chest and the buckle anchor.

If the seat belt is entirely incorporated to the seat, the shoulder anchor and buckle anchor move as a single body, and the two parts experience an identical deceleration. In such a case, it can be assumed that the seat belt can be given as a composite of two springs, and the deceleration acting on the shoulder anchor and buckle anchor is identical to the input to the two-mass spring-mass system or the vehicle body deceleration.

Now, suppose if the buckle anchor point is fixedly attached to the vehicle body while the shoulder anchor is capable of movement relative to the vehicle body as an example in which the two anchor points undergo different movements relative to the vehicle body. In such a case, because the shoulder anchor and buckle anchor experience different decelerations, the springs cannot be simply combined or the decelerations acting on the shoulder anchor and buckle anchor cannot be simply equated to the vehicle body deceleration.

Meanwhile, the external force acting on the chest wholly consists of the force received from the seat belt. Therefore, if the time history of the load acting on the seat belt in the direction of deceleration agrees with the time history of the spring load in the two-mass spring-mass system, the chest receives the same deceleration waveform as the response of the vehicle occupant mass of the two-mass spring-mass system to the optimum waveform of vehicle body deceleration. This enables the vehicle occupant to reach the ride-down state in which the vehicle occupant is restrained by the seat belt substantially without any delay and the relative speed between the vehicle body and vehicle occupant is zero (no difference between the vehicle occupant deceleration G1 and vehicle body deceleration G2).

To achieve a time history of the seat belt that produces such a state, it suffices if the time history of the average deceleration of the shoulder anchor and buckle anchor (or vehicle body) is equal to the optimum waveform of the vehicle body deceleration. Introducing the concept of the waveform of average vehicle body deceleration allows an identical result in reducing the vehicle occupant deceleration as controlling the vehicle body deceleration so as to achieve the optimum waveform to be achieved.

The early rise in the tension of the seat belt to apply the deceleration to the vehicle occupant from an early stage can be provided by a pyrotechnical actuator typically using a propellant. Pyrotechnical actuators are widely known in such applications as vehicle air bags and pretensioners. However, it was found due to the nature of its structure which relies on the generation of high pressure gas that such an actuator alone may not be able to produce a desired time history of the deceleration of the vehicle occupant. Also, not only the handling of pyrotechnical actuators requires a special care, but also the disposal of pyrotechnical actuators requires a special procedure. Based on such considerations, there are cases where the use of a pyrotechnical actuator is not desirable.

BRIEF SUMMARY OF THE INVENTION

In view of such problems of the prior art, a primary object of the present invention is to provide a vehicle occupant protection system which can improve the protection of the vehicle occupant at the time of a vehicle crash for a given dynamic stroke or a deformation stroke of a front part of the vehicle body.

A second object of the present invention is to provide a vehicle occupant protection system which can maximize the protection of the vehicle occupant with a minimum modification to the existing vehicle body structure.

A third object of the present invention is to provide a vehicle occupant protection system which can maximize the protection of the vehicle occupant without increasing the weight of the vehicle body or taking up any significant amount of space in the passenger compartment.

A fourth object of the present invention is to provide a vehicle occupant protection system which can maximize the protection of the vehicle occupant without using any powered actuator.

According to the present invention, such objects can be accomplished by providing an automotive vehicle occupant protection system, comprising: a vehicle body including a chassis for supporting road wheels and a vehicle body main part mounted on the chassis in a relatively moveable manner in a fore-and-aft direction; a seat supported by the vehicle body main part; a seat belt provided in association with the seat and including an end attached to the chassis; means for engaging the vehicle body main part to the chassis under normal condition, and releasing the vehicle body main part from the chassis upon occurrence of a vehicle crash; and a bumper member provided on the chassis and adapted to collide with a stopper member provided on the vehicle body main part after a prescribed rearward travel of the chassis relative to the vehicle body main part.

Thus, upon occurrence of a crash, the chassis having a substantial mass starts decelerating, and moves rearward with respect to the remaining part of the vehicle body. This in turn causes the tension of the seat belt to increase, and the restraint on the vehicle occupant to increase. This is followed by the application of a reverse deceleration to the chassis or to the belt so that the initial sharp rise in the deceleration acting on the vehicle occupant is smoothly connected to the ride down state in which the vehicle occupant decelerates at the same rate as the vehicle body.

The chassis may consist of any part of the vehicle body, but typically provided with parts for supporting road wheels via wheel suspension systems. In the case of a front engine, rear drive vehicle, the chassis may centrally define a floor tunnel in which a propeller shaft extends. The buckle of the seat belt may be conveniently attached to a part of the chassis defining the floor tunnel.

The means for engaging the vehicle body main part to the chassis typically comprises a pair of members provided on the vehicle body main part and the chassis, respectively, which are frictionally engaged to each other. But other arrangements are also possible. For instance, a breakable member may be used for engaging the chassis and vehicle body main part to each other under normal condition. When a force exceeding a prescribed level which is expected to be produced at the time of a vehicle crash is applied to this breakable member, the breakable member ruptures or otherwise breaks so as to allow the chassis to move rearward with respect to the vehicle body main part.

To achieve a highly controlled, desired time history of deceleration, the vehicle body main part may be provided with a pair of side beams each having a front end located somewhat behind the front end of the chassis. Upon occurrence of a vehicle crash, initially, the chassis transmits the deceleration to the vehicle occupant via the seat belt, and the ride-down state is produced only when the chassis has traveled rearward by certain distance, and the relatively movement between the chassis and vehicle body main part has ceased. Immediately before or after this state is achieved, the side beams may jointly deform with the chassis in a controlled manner so as to control the maximum deceleration acting on the vehicle occupant. Typically, at least one of the bumper member and stopper is adapted to undergo a plastic deformation when the bumper member and stopper collide with each other so as to favorably control the time history of the deceleration acting on the vehicle occupant.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
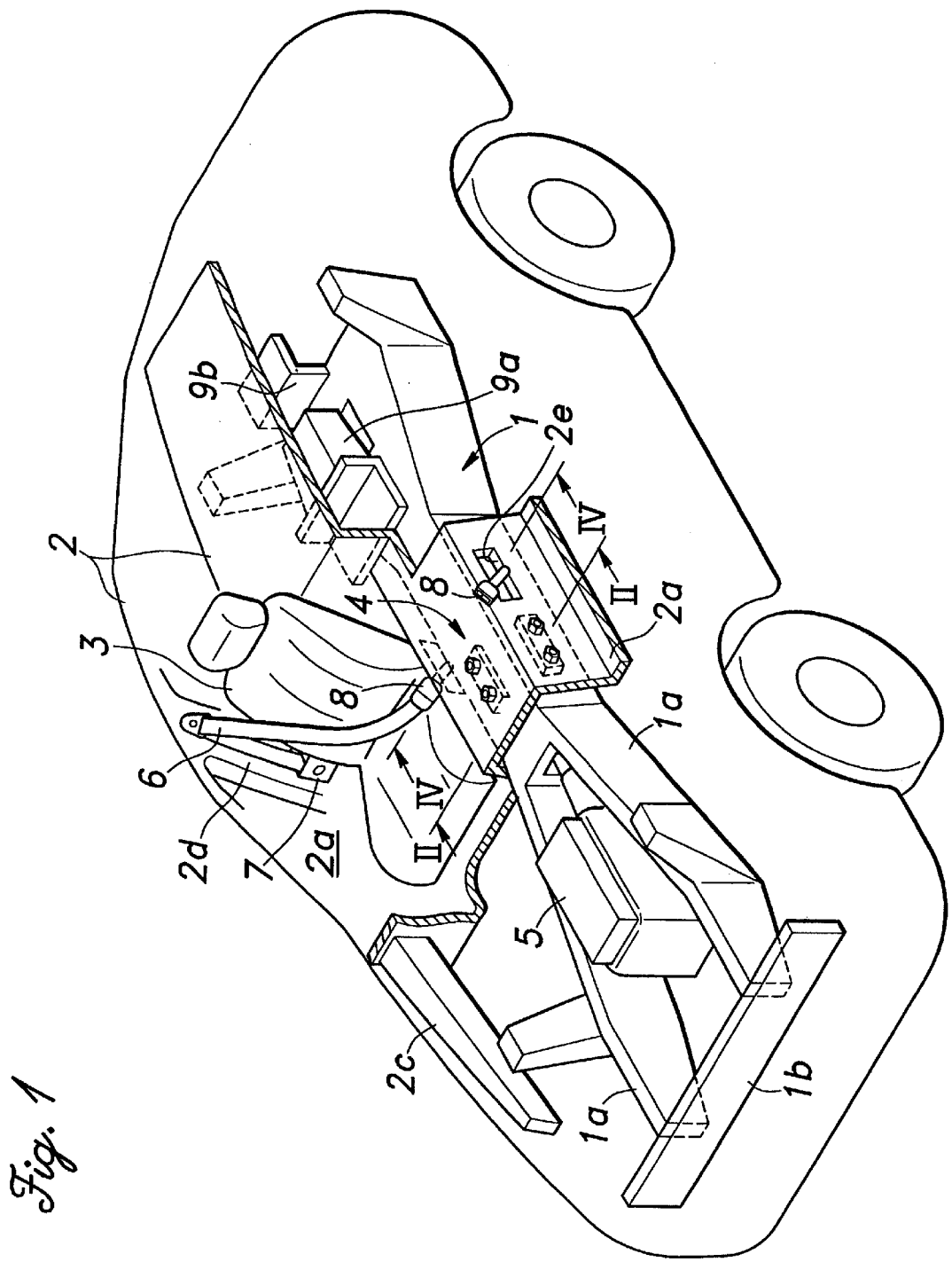
FIG. 1 is a see-through perspective view of a motor vehicle partly in section provided with a vehicle occupant protection system embodying the present invention.

FIG. 1 schematically illustrates the overall structure of a vehicle body incorporated with a vehicle occupant protection system embodying the present invention. The illustrated motor vehicle consists of a front engine, rear drive vehicle. The vehicle body includes a chassis 1 extending in the fore-and-aft direction in a middle part of the vehicle, and a panel body 2 (or a vehicle body main part) which is attached to the chassis 1. The chassis 1 supports four wheels via corresponding suspension systems in front and rear parts thereof. The panel body 2 defines a passenger compartment 2a, and includes a floor panel 2b. A seat 3 is mounted on the floor panel 2b.

Figure 2:
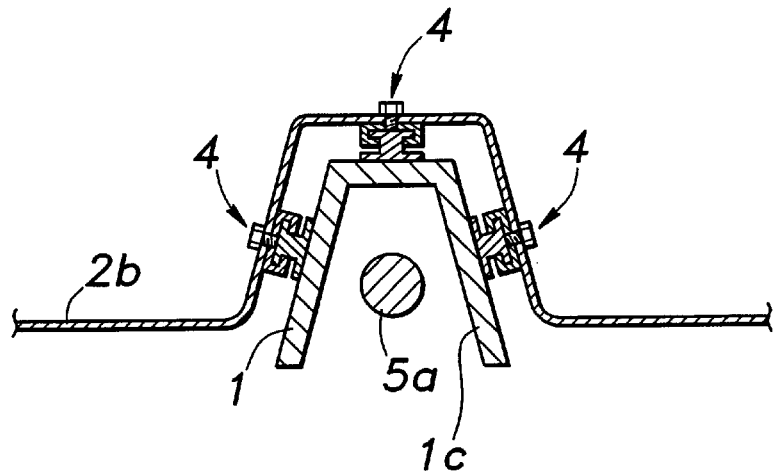
FIG. 2 is a sectional view taken along line II—II of FIG. 1.
Figure 3:
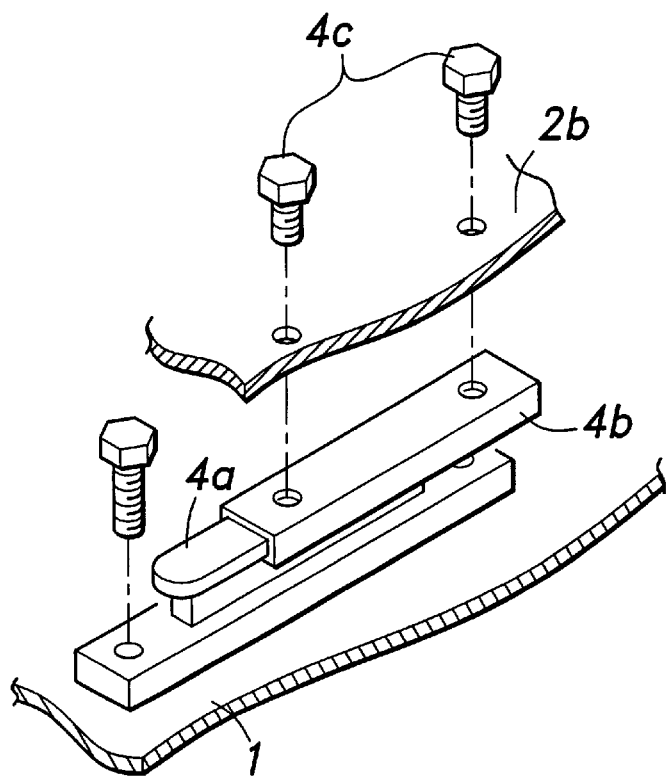
FIG. 3 is a fragmentary exploded view of a part of the vehicle occupant protection system.
Figure 4:
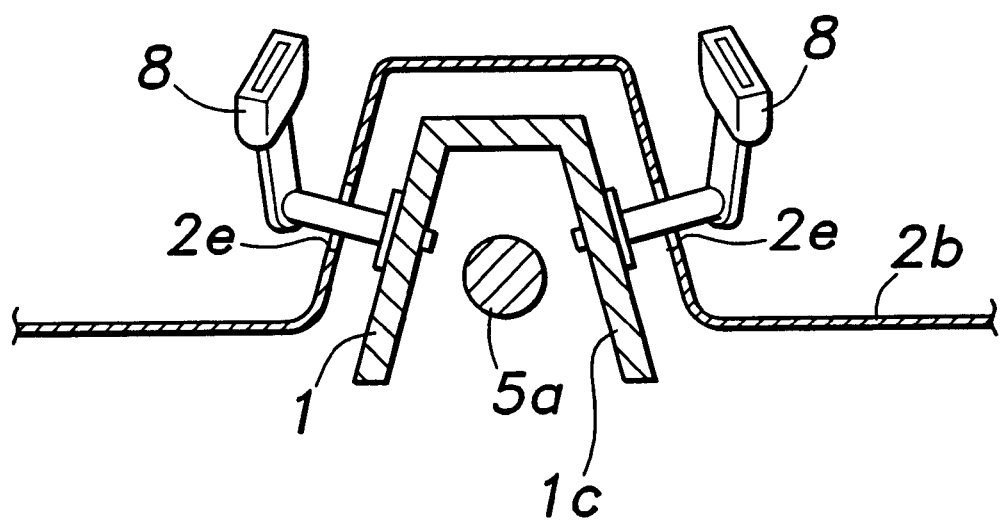
FIG. 4 is a sectional view taken along line IV—IV of FIG. 1.

Referring to FIGS. 1 and 2, the panel body 2, including the floor panel 2b and the seat 3, is combined to the chassis 1 so as to be slidable in the fore-and-aft direction via a plurality of slide guides 4. Each slide guide 4 comprises a slide rail 4a fixedly attached to the chassis 1 and a slider 4b engaged by the slide rail and attached to the floor panel 2b by threaded bolts 4c. Each threaded bolt 4c is passed through the slider 4b, and engages the slide rail 4a at a front end thereof. The tightening load of each threaded bolt 4c therefore determines a limit load for initiating the relative movement of the panel body 2 relative to the chassis 1.

The front end of the chassis 1 comprises a pair of front members 1a which jointly support a bumper beam 1a. A power unit 5 including an engine, transmission and auxiliary equipment is mounted on the front members 1a. A middle part of the chassis 1 defines a floor tunnel 1c, and a propeller shaft 5a extending rearwardly from the power unit 5 is passed inside the floor tunnel 1c. The chassis 1 provides a relatively rigid structure in comparison with the panel body 2 in a front part of the vehicle body. In other words, the front part of the chassis 1 is capable of transmitting deceleration at an early stage of a vehicle crash than the front part of the panel body 2 which is adapted to more readily deform than the corresponding part of the chassis 1.

The panel body 2 comprises a pair of upper side beams 2c extending in the fore-and-aft direction on either side of a front part of the panel body 2, and front ends of the upper side beams 2c are located somewhat behind the bumper beam 1b. The part of the panel body 2 located ahead of the front ends of the upper side beams 2c are adapted to deform significantly more readily than the chassis front members 1a, and the panel body 2 would not decelerate to any significant extent until the upper side beams 2c collide with the object of the crash either directly or via the bumper beam 1b.

The seat belt 3 in the illustrated embodiment is provided with three anchor points. An end of the seat belt 6 is attached to a lower part of the center pillar 2d of the panel body 2, and the other end thereof is connected to a retractor 7 provided inside the center pillar 2d. A tongue plate fitted on an intermediate part of the seat belt 6 is latched to a buckle 8 which is attached to the chassis 1 and extends out of an opening 2e formed in the floor panel 2b. Thus, a vehicle occupant in the seat 3 is restrained to the seat by the seat belt 6. The seat 3 is mounted on the floor panel 2b so as to be adjustable in the fore-and-aft direction.

A bumper member 9a formed of a plate member and defining a closed cross section is provided in a rear part of the chassis 1. The vehicle body is provided with a stopper member 9b which is located behind the bumper member 9a in a spaced relationship. The collision of the bumper member 9a with the stopper member 9b causes a controlled plastic deformation of the bumper member 9a, and provides a reverse deceleration to the chassis as will be described hereinafter.

Referring to FIGS. 5 to 8, the mode of operation of the illustrated embodiment of the present invention is described in the following by taking an example of a frontal crash onto a fixed structure.

Figure 5:
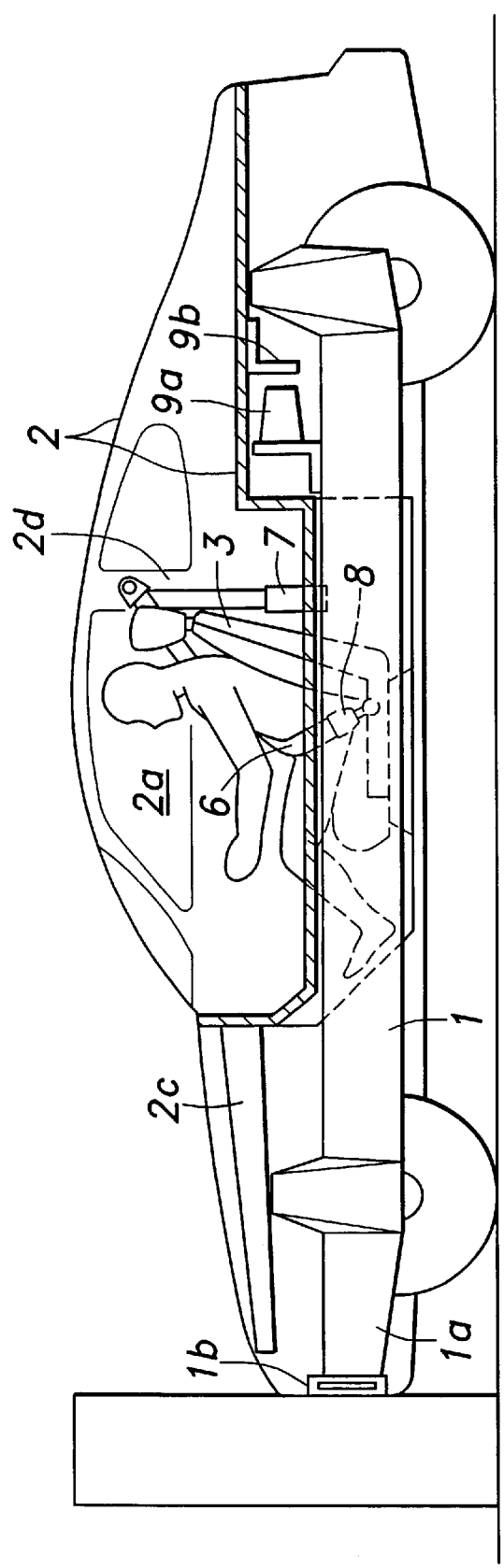
FIG. 5 is a schematic side view of the vehicle occupant protection system immediately after a crash.

FIG. 5 shows a state of an initial phase (interval a of FIG. 8) immediately following the occurrence of a crash. First of all, as the front end of the panel body 2 including the floor panel 2b and the bumper beam 1b collide with the fixed structure, the front end of the panel body 2 starts deforming under compression. On the other hand, the chassis 1 remains relatively intact, and starts decelerating earlier than the panel body 2. When the relative load between the chassis and panel body exceeds the limit load defined by the tightening load of the threaded bolts 4c, a relative movement is produced between the chassis 1 and panel body 2. More specifically, the chassis 1 moves rearward with respect to the panel body 2.

At the same time as the relatively movement is caused between the chassis 1 and panel body 2, the buckle 8 attached to the chassis 1 also moves rearward with respect to the panel body 2, or in the direction to increase the restraint on the vehicle occupant. This movement of the buckle 8 produces a load that tends to increase the deceleration of the vehicle occupant. Therefore, the vehicle occupant is subjected to a relatively sharp increase in deceleration from an early stage of the crash. The resulting rise in the seat belt load is earlier than that provided by a conventional seat belt which is simply secured at three anchor points in restraining the vehicle occupant from being thrown forward under the inertia force. Therefore, the deceleration of the vehicle occupant is made to rise from a very early part of the crash as indicated by G1 in FIG. 8.

Figure 6:
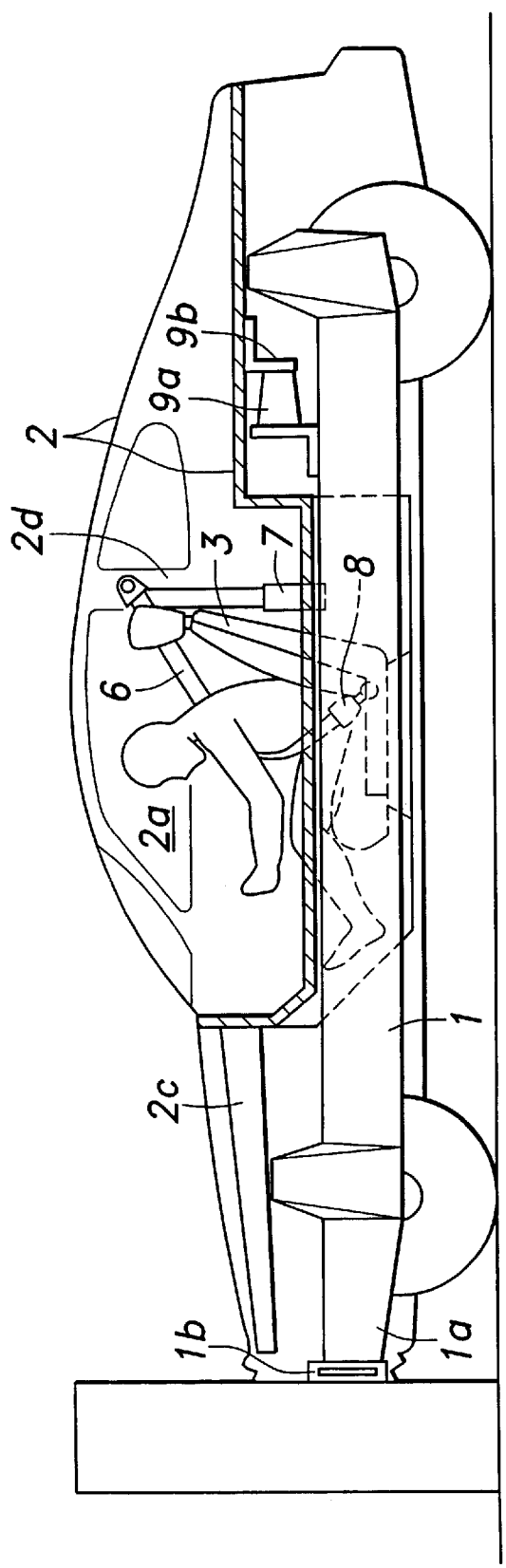
FIG. 6 is a view similar to FIG. 5 showing an intermediate stage of the crash.
Figure 8:
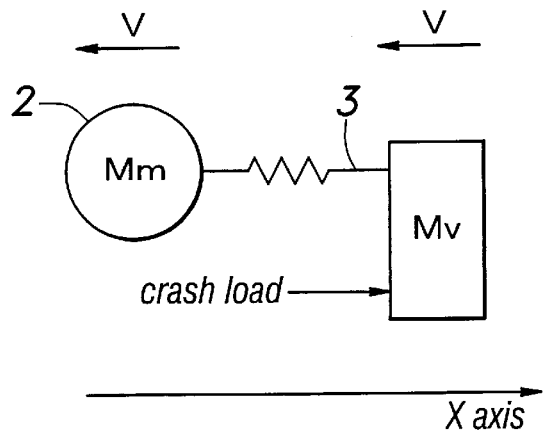
FIG. 8 is a diagram showing the waveforms of the vehicle occupant deceleration and vehicle body deceleration.
Figure 9:
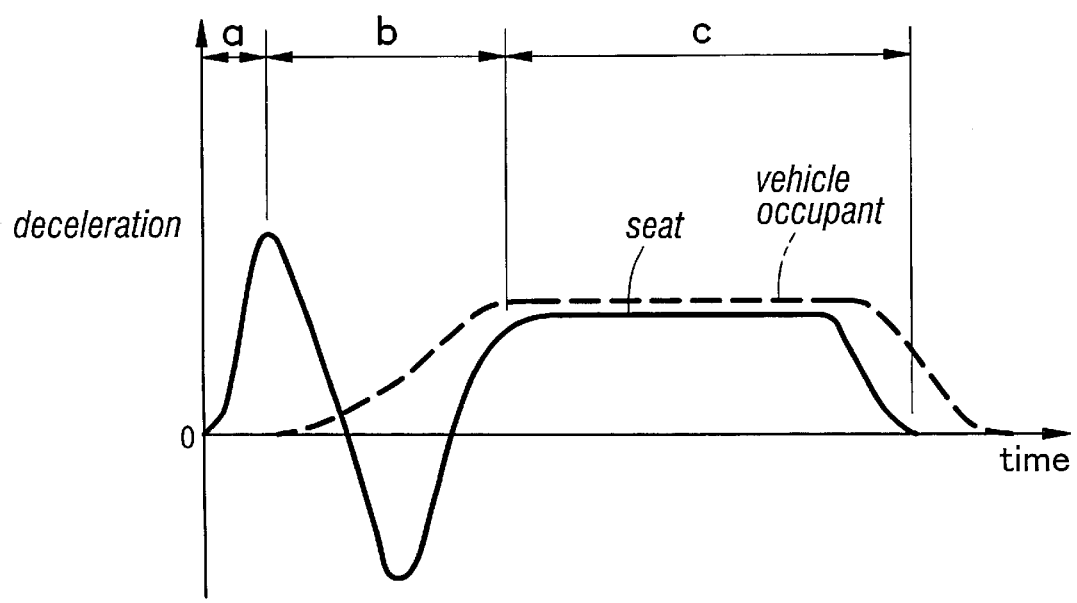
FIG. 9 is a conceptual diagram showing the relationship between the vehicle occupant, vehicle body and seat belt at the time of a vehicle crash.

FIG. 6 shows a state in an intermediate phase of the crash (interval b of FIG. 8). As the collapsing of the front part of the vehicle body progresses, the chassis 1 decelerates even further, and the panel body 2 continues to move forward relative to the chassis 1. Eventually the bumper member 9a collides with the stopper member 9b, and progressively collapses so that the relative movement between the chassis 1 and panel body 2 decelerates and the buckle 8 is subjected to a forward acceleration. In other words, the deceleration acting on the vehicle occupant is reduced. Because the chassis 1 is provided with a significant amount of mass, the spring mass system including the seat belt, vehicle occupant and chassis behaves in a substantially stable manner. The power unit 5 (in particular the engine) is mounted on the chassis 1, and this provides a large amount of inertia mass to the movement of the chassis 1. To achieve an optimum waveform of deceleration as described hereinafter, provisions can be made so as to allow at least part of the power unit 5 such as the engine to move independently from the chassis 1 at the time of a vehicle crash.

Figure 7:
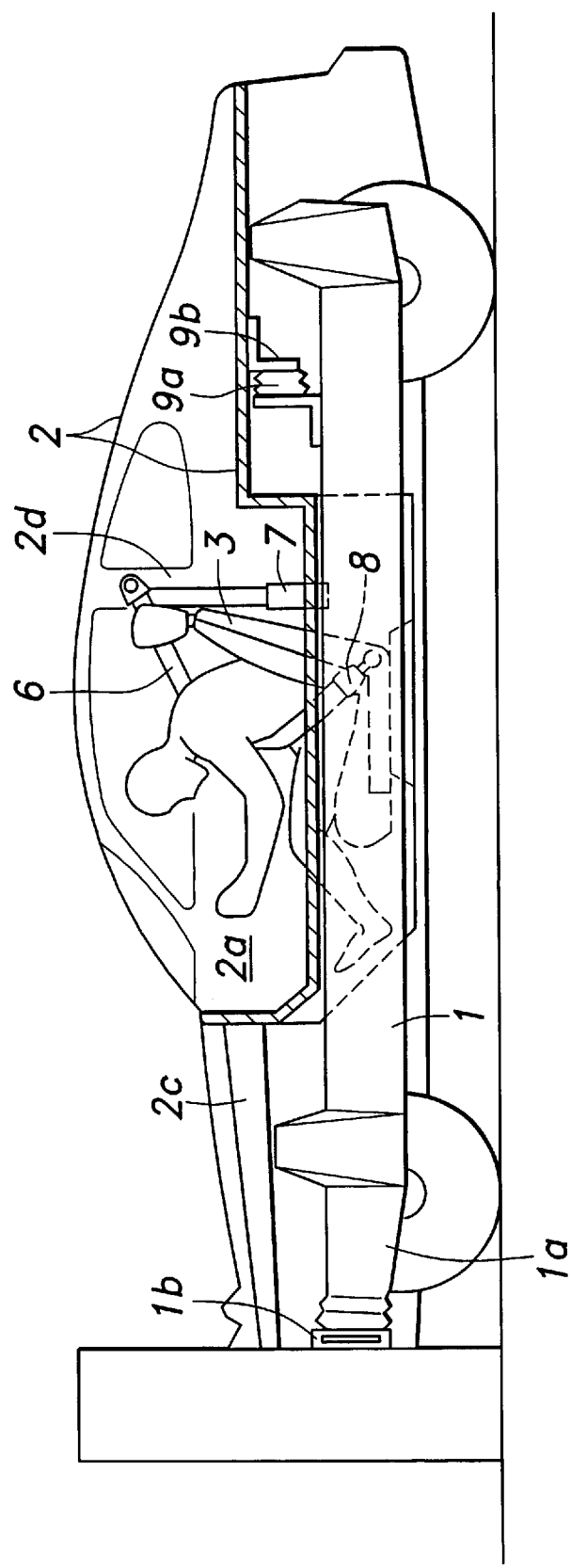
FIG. 7 is a view similar to FIG. 5 showing a later stage of the crash.

FIG. 7 shows a state of a final phase (interval c of FIG. 8) of the crash. During the final phase, the upper side beams 2c also collide with the fixed structure, and starts collapsing. This, combined with the collapsing of the bumper member 9a further decelerates the relative movement between the chassis 1 and panel body 2. It also means that the movement of the buckle 8 ceases. At this point, there is no relative movement between the vehicle occupant and the vehicle body as a whole, or the ride-down state is produced.

Thus, according to the foregoing embodiment, by controlling the movement of the chassis along with the buckle relative to the part of the vehicle body supporting the seat according to a prescribed pattern, the vehicle occupant is allowed to experience an early rise in deceleration. Then, after the chassis has moved relative to the panel body by a prescribed distance, the movement is prevented by the collision of the bumper member with the stopper member, an opposite deceleration is produced in the chassis so that the vehicle occupant and vehicle body move as a single body in a final phase of the crash, and decelerate at the average deceleration. This achieves a waveform of vehicle body deceleration suitable for the minimization of the deceleration of the vehicle occupant. As a result, not only a substantial reduction in the vehicle occupant deceleration can be achieved with a smaller vehicle body deformation (dynamic stroke) but also the displacement of the vehicle occupant within the passenger compartment is minimized and the possibility of a secondary collision is reduced.

Although the present invention has been described in terms of a preferred embodiment thereof, it is obvious to a person skilled in the art that various alterations and modifications are possible without departing from the scope of the present invention which is set forth in the appended claims. For instance, additional anchor points may be provided on parts of the chassis. It is also possible to provide all of the anchor points on the chassis 1.

What is claimed is:

1. An automotive vehicle occupant protection system, comprising:
   a vehicle body including a chassis for supporting road wheels and a vehicle body main part mounted on said chassis in a relatively moveable manner in a fore-and-aft direction;
   a seat supported by said vehicle body main part;
   a seat belt provided in association with said seat and including an end attached to said chassis;
   means for engaging said vehicle body main part to said chassis under normal condition, and releasing said vehicle body main part from said chassis upon occurrence of a vehicle crash; and
   a bumper member provided on said chassis and adapted to collide with a stopper member provided on said vehicle body main part after a prescribed rearward travel of said chassis relative to said vehicle body main part.

2. An automotive vehicle occupant protection system according to claim 1, wherein said chassis centrally defines a floor tunnel in which a propeller shaft extends.

3. An automotive vehicle occupant protection system according to claim 1, wherein a buckle of said seat belt is attached to a part of said chassis defining said floor tunnel.

4. An automotive vehicle occupant protection system according to claim 1, wherein said means for engaging said vehicle body main part to said chassis comprises a pair of members provided on said vehicle body main part and said chassis, respectively, which are frictionally engaged to each other.

5. An automotive vehicle occupant protection system according to claim 1, wherein said vehicle body main part is provided with a pair of side beams each having a front end located somewhat behind said front end of said chassis.

6. An automotive vehicle occupant protection system according to claim 1, wherein at least one of said bumper member and stopper is adapted to undergo a plastic deformation when said bumper member and stopper collide with each other.

7. An automotive vehicle occupant protection system according to claim 1, wherein said chassis supports a component of a power unit.

* * * * *